(12) United States Patent
Genser

(10) Patent No.: US 6,666,457 B2
(45) Date of Patent: Dec. 23, 2003

(54) SEALING DEVICE FOR SEALING A CAVITY ROTATABLE ABOUT A ROTATION AXIS

(76) Inventor: Hans Georg Genser, Bölleinsmühle, D-91639 Wolframs-Eschenbach (DE)

( * ) Notice: Subject to any disclaimer, the term of this patent is extended or adjusted under 35 U.S.C. 154(b) by 106 days.

(21) Appl. No.: 09/928,075

(22) Filed: Aug. 10, 2001

(65) Prior Publication Data

US 2002/0069837 A1 Jun. 13, 2002

(30) Foreign Application Priority Data

Aug. 10, 2000 (DE) ........................................ 100 38 986

(51) Int. Cl.$^7$ ................................................ F16J 15/34
(52) U.S. Cl. ........................................ 277/401; 277/408
(58) Field of Search ................................ 277/359, 408, 277/377, 389, 931, 370, 401; 159/5, 9.1, 11.1, 11.3

(56) References Cited

U.S. PATENT DOCUMENTS

| | | | | |
|---|---|---|---|---|
| 2,536,292 A | * | 1/1951 | Kollsman | 277/399 |
| 2,573,425 A | * | 10/1951 | Fletcher, Jr. | 277/424 |
| 3,311,457 A | * | 3/1967 | Goossens | 23/283 |
| 3,472,304 A | * | 10/1969 | Evkin | 159/6 |
| 3,547,593 A | * | 12/1970 | Olevsky et al. | 23/283 |
| 3,661,398 A | * | 5/1972 | Hummer | 277/397 |
| 4,527,900 A | * | 7/1985 | Mehta et al. | 366/99 |
| 4,529,478 A | * | 7/1985 | Mehta et al. | 159/9.1 |
| 4,645,414 A | * | 2/1987 | DeHart et al. | 415/83 |
| 4,708,711 A | * | 11/1987 | Scherer | 494/41 |
| 5,133,561 A | * | 7/1992 | Hattori et al. | 277/646 |
| 5,185,060 A | * | 2/1993 | Yamasaki et al. | 159/13.1 |
| 5,273,656 A | * | 12/1993 | Anderson et al. | 210/635 |
| 5,334,290 A | * | 8/1994 | Nuns et al. | 202/205 |
| 5,447,077 A | * | 9/1995 | Lautenschlager | 73/863.11 |
| 5,553,868 A | * | 9/1996 | Dunford | 277/24 |
| 5,617,879 A | * | 4/1997 | Kubala | 285/95 |
| 5,702,582 A | * | 12/1997 | Goldstein et al. | 204/632 |
| 5,906,374 A | * | 5/1999 | Arbuckle | 277/304 |
| 5,992,901 A | * | 11/1999 | Gohres et al. | 285/121.2 |
| 6,238,524 B1 | * | 5/2001 | Zebuhr | 202/185.1 |

FOREIGN PATENT DOCUMENTS

| | | | | |
|---|---|---|---|---|
| DE | 3641152 A1 | * | 6/1988 | B01D/1/22 |
| JP | 3-249481 | | * 11/1991 | F16J/15/20 |

* cited by examiner

Primary Examiner—Anthony Knight
Assistant Examiner—Michael J. Kyle
(74) Attorney, Agent, or Firm—Sidley Austin Brown & Wood, LLP (57) ABSTRACT

A sealing device for sealing a cavity (40) rotatable around a rotational axis (A) includes at least two sealing areas separated from each other by at least one intermediate zone (Z1 to Z3), two sealing faces (20, 21 to 24, 30, 31 to 33, 41, 71 to 74) continuously extending around the rotational axis and slidingly movable over each other upon rotation of the cavity (40), and at least one connection (A1 to A3, B1 to B3) for charging, discharging, or passing fluids into, out of, or through the at least one intermediate zone and which serves as a buffer zone for reducing or compensating the leakage.

35 Claims, 8 Drawing Sheets

SEALING DEVICE FOR SEALING A CAVITY ROTATABLE ABOUT A ROTATION AXIS

BACKGROUND OF THE INVENTION

1. Field of the Invention

The invention relates to a sealing device for sealing a cavity that can be rotated around a rotational axis, especially a cavity of a rotary film evaporator.

2. Description of the Prior Art

In order to evaporate substances, for example, in order to evaporate solvents during the concentration of pharmaceutical or chemical products, rotary film evaporators are used, such as for example, the commercially available rotary film evaporators made by Genser Wissenschaftliche Apparate (a scientific equipment company) based in Rothenburg o.d.T., Germany. With these known rotary film evaporators, the liquid substances to be evaporated are placed into the cavity of a rotating flask (evaporator vessel), usually in a heating bath. By rotating the flask, a thin liquid film is created on the inside of the rotating flask and the substance, especially the solvent, evaporates from said liquid film. A certain amount of the substance or of the solvent also evaporates directly out of the liquid surface in the rotating flask. The vapor is transported out of the rotating flask through a vapor line to a condenser, where it is condensed out again. In general, a negative pressure or vacuum is also generated in the rotating flask in order to increase the vapor pressure of the substances to be evaporated and in order to treat the product gently. The vapor line is connected in a passage area to the rotating flask via a rotatable connection. The connection site is sealed by means of an axial sliding ring sealing device that has a sliding ring arranged concentrically to the rotational axis on the rotating flask and a counter sealing face on the vapor line on which the sliding ring slides when the flask rotates. The sliding ring is made of a PTFE compound (PTFE/glass), the counter sealing face on which the sliding ring slides is often made of glass. However, it is also known to employ radial shaft seals, for example, radial sliding rings (shaft sealing rings) cooperating with a corresponding cylindrical counter sealing face to seal the system.

Extremely high demands are made to the sealing system of a rotary film evaporator. It has to be resistant to virtually all chemicals and has to remain leak-tight over a long period of time. Moreover, when leaks occur in the sealing system, sometimes spontaneously, the vacuum in the system deteriorates, that is to say, the pressure rises. This vacuum deterioration leads to an increase in the boiling temperature (or to a reduction of the vapor pressure) and thus to a rise in the product temperature. This is normally ameliorated by the fact that the heating bath temperature is set at a value that is not critical for the product. However, the drawback of this approach is that the evaporation performance is worse. Furthermore, as a result of a leak, product losses or even product destruction can occur, which is often associated with substantial financial losses in the case of sensitive and expensive products.

For these reasons, both sealing faces are machined mechanically precisely so that the leakiness at this sealing site is as small as possible. In the case of a sliding ring seal, there can also be an adjustment means for the sliding ring or for the opposite side in order to compensate for temperature differences and/or wear and tear of the seal. These known measures yield a final vacuum value of at least 0.1 mbar in the rotary film evaporator without any problems when a commercially available laboratory oil vacuum pump (rotary slide-valve pump) with a suction capacity of about 2500 liters per hour is used to evacuate the rotary film evaporator. EP 0,504,099 B1 discloses a rotary film evaporator with which the leak-tightness of a sealing system for carrying the vapor to the rotating flask is improved in that two tubular or annular parts are arranged coaxially to the rotational axis and adjacent to each other, whose front ends facing each other form sealing faces that slide on each other. These sealing tube parts or sealing ring parts are made of a sliding plastic, glass, ceramic or carbon material and especially of a PTFE composite material. A stationary sealing ring is additionally arranged on the outside of the lateral surface area of each of the two tubular or annular parts.

The object of the present invention is to provide a sealing device for a rotatable cavity, especially of a rotary film evaporator, with improved leak-tightness.

SUMMARY OF THE INVENTION

This and other objects of the present invention, which will become apparent hereinafter, are achieved by providing a sealing device for sealing a rotatable cavity that can be rotated around a rotational axis, especially a cavity of a rotary film evaporator, which comprises a) a number $n \geq 2$ of sealing areas that are separated from each other by n−1 intermediate zones (interspaces) that each lie between two sealing areas and in each of which two sealing faces, which run continuously (coherently) around the rotational axis, can be moved (rotated) slidingly (abrasively, prone to wear and tear) on each other when the cavity rotates, and b) at least one, especially lockable, connection for at least one of the intermediate zones for charging and/or discharging and/or passing fluids (vapor) into or out of or through the intermediate zone.

The present invention is based on the notion of creating at least one additional buffer zone that is located in the seal between the cavity and an outer, generally air-filled, chamber and that is in the form of an intermediate zone which, in the flow direction for fluids flowing through the seal in case of a leak, is arranged in series with respect to the other sealing areas with the flat or curved sealing faces that slide on each other. This buffer zone or these buffer zones can be flow-connected via the appertaining connection to a fluid-filled chamber or a fluid conveying means. In this manner, the interfering influence of an existing leak can be diminished or compensated for in a desired manner, for example, by generating a defined pressure, especially a negative pressure, or a defined gas atmosphere in the intermediate zone.

Alternatively, the sealing device for sealing a cavity that can be rotated around a rotational axis, especially a cavity of a rotary film evaporator, can comprise a) at least two sealing faces that slide on each other and can be rotated opposite from each other and b) at least one surface-pressure control element to control the surface pressure with which the sealing faces that slide on each other can be pressed against each other, whereby c) the surface-pressure control element has a control connection to apply a controlling quantity.

Through these measures, it is possible to compensate for wear and tear or thermal expansion behavior of the sealing faces by an automatic setting or adjustment of the surface pressure of the sealing system. The formation of a gap between the sealing faces can be avoided.

In a first advantageous embodiment of the sealing device, the sealing areas are located radially, that is to say, perpendicular to the rotational axis, at a distance from each other relative to the rotational axis. This embodiment corresponds to an axial seal or axial shaft seal that has been improved according to the invention, including, for example, an axial sliding ring seal. The intermediate zones and the sealing areas are then preferably arranged concentrically around the rotational axis, but they can also be arranged eccentrically. In addition to the preferred annular or hollow-cylindrical shape, the intermediate zones and the sealing areas can also have a different closed shape, for example, an elliptical shape. Preferably the sealing faces are aligned essentially orthogonally relative to the rotational axis.

In a second and likewise advantageous embodiment of the sealing device, the sealing areas are arranged axially relative to the rotational axis, that is to say, parallel to the rotational axis, staggered with respect to each other. This embodiment corresponds to a radial seal or radial shaft seal that has been improved according to the invention, which can be configured as a radial sliding ring seal. The sealing faces are especially configured essentially rotation-symmetrically relative to the rotational axis and preferably run parallel to the rotational axis, that is to say, in the shape of a cylindrical surface.

The sealing faces of the sealing areas are generally formed with surfaces of sealing bodies facing each other, whereby at least a first sealing body can be rotated along with the cavity (is not stationary in the reference system of the surroundings of the cavity) and at least a second sealing body cannot rotate along with respect to the cavity (is stationary in the reference system of the surroundings). The first sealing body or bodies can be formed with a wall of the cavity or—as a prefabricated part—can be connected to a wall of the cavity at the end or on the outside. In particular, at least one of the sealing bodies can be a sliding ring. The intermediate zones between the sealing areas are generally configured with recesses (dents, grooves) or openings (gaps, passages) in only one of the sealing bodies (alternately or all in the same sealing body) or in both sealing bodies, or else with interspaces between several individual sealing bodies.

In an especially advantageous embodiment, in order to seal a connection area of the rotatable cavity, the sealing device is provided with a stationary additional cavity that serves especially as a line to charge and/or discharge fluids into or out of the rotatable cavity. Therefore, the transition area between the two cavities that are rotatable opposite from each other serves especially as a fluid passage area. The second sealing body is then preferably formed with a wall of the stationary additional cavity or—as a prefabricated part—connected to a wall of the stationary additional cavity on the outside or at its end, for example, in the form of a sliding ring.

The connections can also be arranged spatially staggered with respect to the intermediate zones and are then connected to the intermediate zones by means of lines. These lines preferably run through the cavity or one of the cavities.

The connections provided according to the invention for the intermediate zones can be used advantageously in many ways.

In an especially advantageous embodiment, fluid conveying means are connected to the at least one connection of at least one intermediate zone in order to convey desired fluids into the intermediate zone or to convey fluids that are present in the intermediate zone out of the intermediate zone, or else to convey a fluid between two connections through the intermediate zone. The fluid delivery means preferably comprises a flow machine such as a pump, but can also consist of a gas or liquid reservoir (e.g. pressurized cylinder) that is under a certain pressure.

This fluid delivery can preferably be regulated, whereby preferably the connections are also regulated, that is to say, they can be at least partially closed and opened again.

Thus, via the fluid delivery means, the pressure in the at least one intermediate zone is preferably regulated, especially in order to generate a vacuum (negative pressure).

In an especially advantageous embodiment, the pressure differential between the pressure in the at least one intermediate zone (zone pressure) on the one hand, and the pressure in the rotatable cavity (internal pressure) on the other hand, can be set at or regulated to a prescribed value (setpoint, reference value).

The prescribed value of the pressure differential between the pressure in the at least one intermediate zone on the one hand, and the pressure in the rotatable cavity on the other hand, can be essentially equal to zero. Relative to the cavity and the internal pressure prevailing there, practically no more leaking can be detected.

In contrast, if the setpoint for the pressure differential is set at greater than zero, then in case of a leak, depending on the amount of the pressure differential, air flows out of the outer chamber as a result of the higher pressure prevailing there (atmospheric pressure) into the evacuated cavity. This can be tolerated as long as the air quantity flowing in is so small that it is negligible in the cavity in terms of the process technology.

In a further embodiment, the zone pressure in the intermediate zone is set so as to be less than the internal pressure in the cavity. In case of a leak, gas or vapor from the evacuated cavity enters the zone. This can either be accepted if the quantity is not too great or else preferably a collecting means is added onto the connection of the intermediate zone in order to collect and possibly reutilize the substances that have entered the intermediate zone. The collecting means can be, for example, a condensation device for condensing the vapors or an absorption device for absorbing the vapors.

In addition to an evacuation of the intermediate zones as a mode of operation (operating method) of the sealing device, it is also possible to feed fluids having the desired composition into the intermediate zone. In this manner, numerous functions can be achieved.

In a special embodiment, a liquid or gaseous coolant or heating medium is conveyed through at least one intermediate zone in order to cool or heat the sealing areas. Here, the sealing faces that lie opposite from each other can both be heated or cooled, whereby the temperatures can also be different.

Furthermore, it is advantageously possible to fill the intermediate zones with fluids that are process-neutral or process-inherent (present in the process) for a process that takes place in a rotatable cavity or in a process chamber that is connected to said cavity, especially a rotary film evaporation process in a rotary film evaporator. Examples of process-neutral fluids are inert gases such as noble gas or nitrogen or inert liquids and gaseous or liquid solvents for process-inherent fluids or other substances that are to be evaporated or that have already evaporated.

In order to improve the sliding behavior at the sealing faces that slide on each other, in another mode of operation, a sliding agent or lubricant can also be applied to these faces via the at least one intermediate zone, whereby the term fluid, in addition to liquid lubricants such as, for example, oils, is also meant to include greases and solid lubricants such as viscous pastes or the like.

Another mode of operation for the sealing device is characterized in that a cleaning fluid, for example, a solvent, is applied to the sealing faces through the at least one intermediate zone in order to remove dirt from the sealing faces and/or in the intermediate zones.

Finally, the connections of the intermediate zones can also be used to measure the pressure in the intermediate zone or zones. Then, the individual connection site is connected to a corresponding measuring means which, in turn, is preferably connected to an evaluation means in order to evaluate the measured pressure values. The evaluation can comprise especially the detection of pressure changes, which can be used as a measure of any leaks.

In order to set the surface pressure between the sealing faces, as the surface-pressure control element, in an advantageous embodiment, an expansion element that can be differently expanded in the normal direction relative to the sealing faces as a function of the controlling quantity can be used such as, for example, a pneumatic or hydraulic element that is controlled via a pressure as the controlling quantity at the control connection, an element that can be electrically controlled via a control current or a control voltage as the controlling quantity, especially an electric linear motor, or a thermal expansion element whose length depends on its temperature, whereby then a thermal quantity is used as the controlling quantity at the control connection.

In an advantageous mode of operation, a monitoring means is provided that monitors the leak-tightness at the sealing faces, especially using the intermediate zones, and that keeps said leak-tightness within a prescribed or prescribable tolerance range by controlling the surface-pressure control element.

In a cleaning or disinfecting mode, the surface pressure of the sealing faces can also be increased temporarily by means of the surface-pressure control element in order to warm up the sealing areas by means of friction.

A preferred application for the rotation seal according to the invention is in a rotary film evaporator for sealing a rotatable cavity of the rotary film evaporator, especially the rotating flask in which the substances are evaporated, or in a feed line to the rotating flask. The sealing effect here can still be additionally improved in that at least one sealing device configured as a radial seal according to the invention is arranged in series with at least one sealing device according to the invention configured as an axial seal. Moreover, this measure is also advantageous with the prior art seals when it comes to reducing leaks.

BRIEF DESCRIPTION OF THE DRAWINGS

The invention will now be explained in greater details with reference to the accompanying drawings, wherein.

DETAILED DESCRIPTION OF THE PREFERRED EMBODIMENTS

In all of the FIGS. 1 through 15, in which corresponding elements are designated with the same reference numerals, a rotating flask of the rotary film evaporator is designated with the numeral 4, the cavity or inner chamber of the rotating flask 4 is designated with the numeral 40 and the wall of the rotating flask 4 surrounding the inner chamber 40 is designated with the numeral 41, and a drive for rotating the rotating flask 4 around a rotational axis A is designated with the numeral 7.

Figure 9:
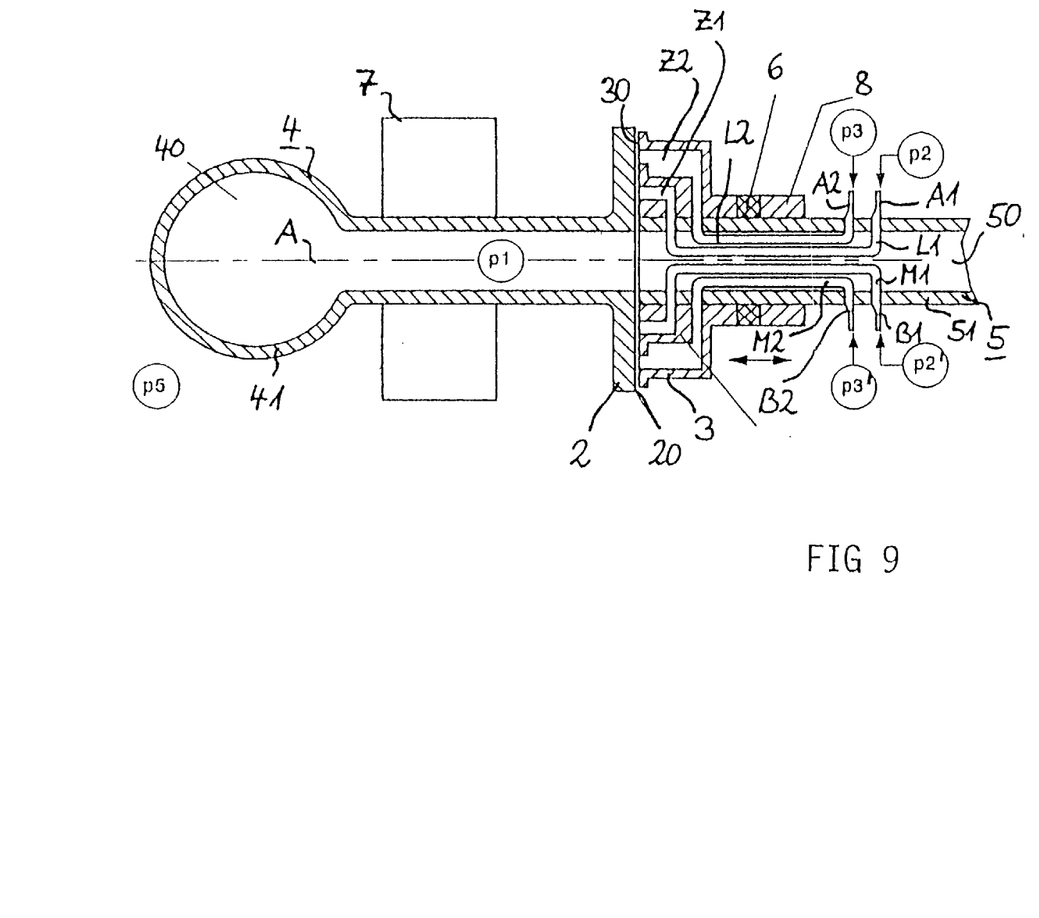
FIG. 9—shows a longitudinal cross-sectional view of a rotary film evaporator with a sealing device to seal the rotating flask and the vapor line with two concentric intermediate zones and feed lines to the intermediate zones.
Figure 10:
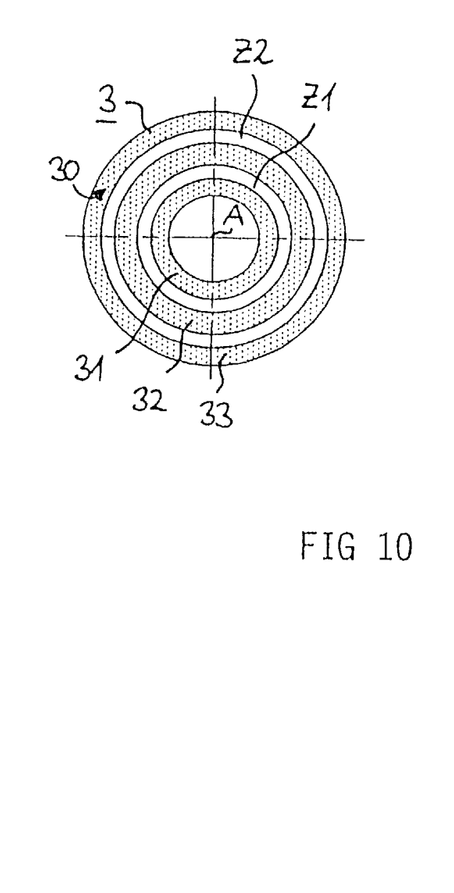
FIG. 10—shows a transverse cross-sectional view of the sealing device according to FIG. 9 on the vapor line.
Figure 11:
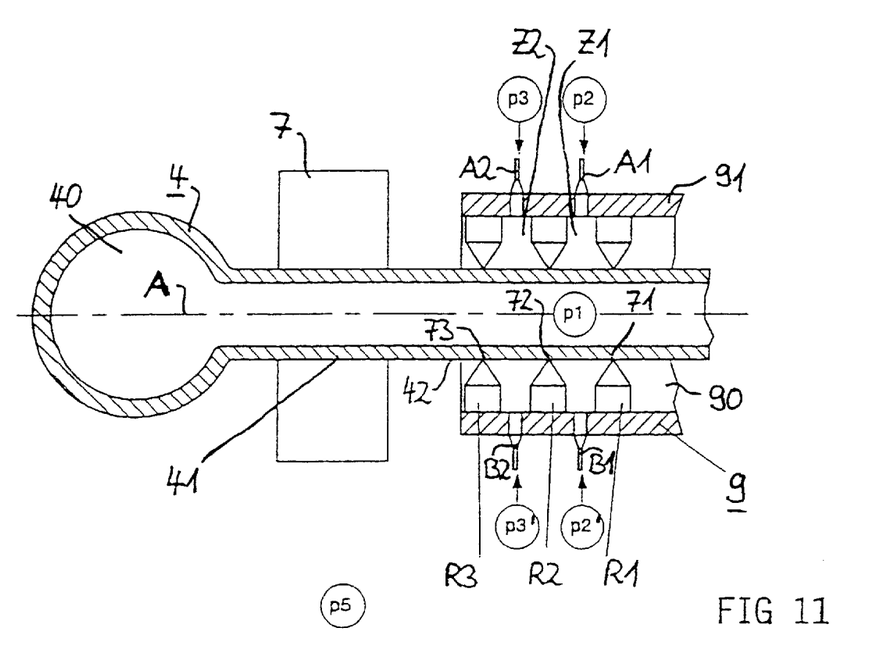
FIG. 11—shows a longitudinal cross-sectional view of a rotary film evaporator with a sealing device to seal the rotating flask and the vapor line with two axially staggered intermediate zones.
Figure 12:
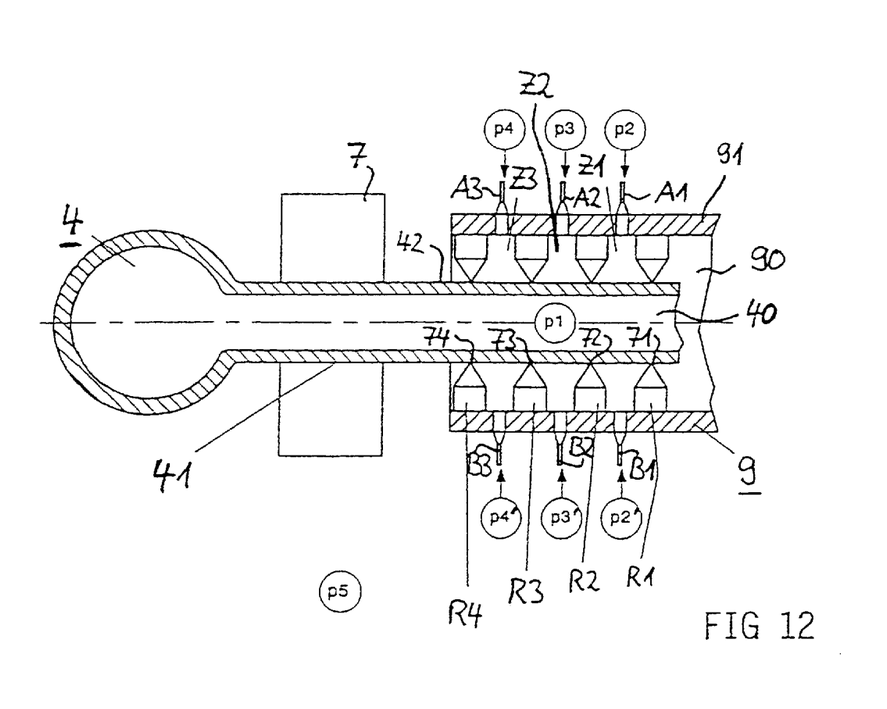
FIG. 12—shows a longitudinal cross-sectional view of a rotary film evaporator with a sealing device to seal the rotating flask and the vapor line with three axially staggered intermediate zones.
Figure 13:
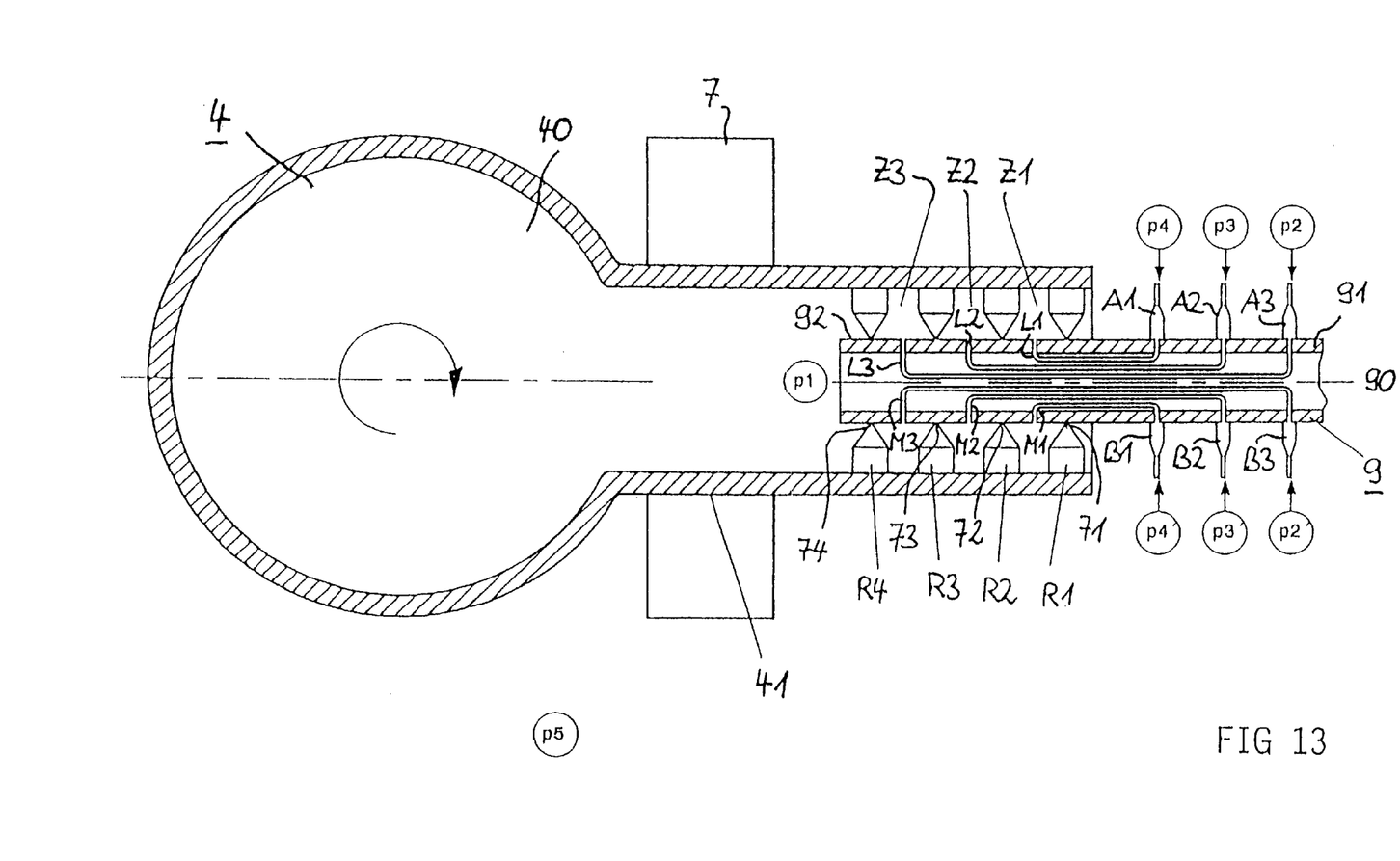
FIG. 13—shows a longitudinal cross-sectional view of a rotary film evaporator with a sealing device to seal the rotating flask and the vapor line with three axially staggered intermediate zones and feed lines.

Axial seals of the axial sliding ring seal type for the rotating flask 4 are shown in FIGS. 1 through 10, and radial seals of the type of radial sliding ring seals are shown in FIGS. 11 through 13.

A line, which remains stationary with respect to the rotating flask 4, for charging and discharging gaseous substances into and out of the rotating flask 4 is designated in FIGS. 1 through 10 with the numeral 5 and in FIGS. 11 through 13 with the numeral 9. The inner chamber of the line is designated in FIGS. 1 through 10 with the numeral 50 and in FIGS. 11 through 13 with the numeral 90, the wall of the lines 5 and 9 that delineates the inner chamber is designated with 51 and 91, respectively. A condenser (not shown here) can be provided on the end of the line 5 facing away from the rotating flask 4 in order to condense out the evaporated substances.

Figure 1:
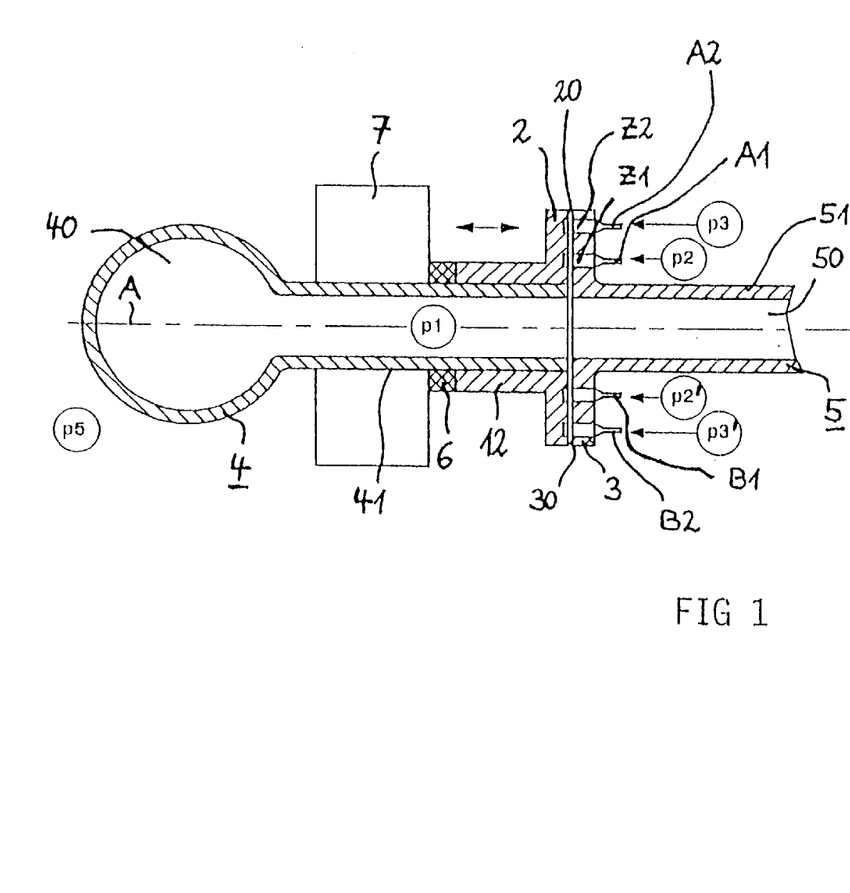
FIG. 1—shows a longitudinal cross-sectional view of a rotary film evaporator with a rotating flask, a vapor line and a sealing device for sealing the rotating flask and the vapor line with two intermediate zones.
Figure 2:
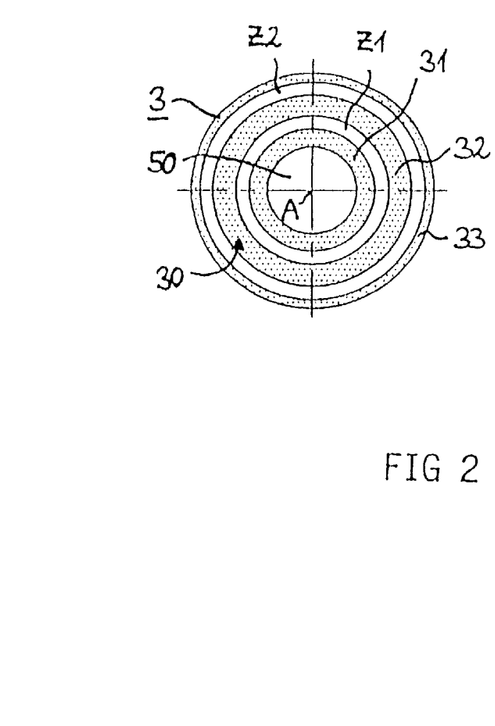
FIG. 2—shows a transverse cross-sectional view of the sealing device according to FIG. 1 on the vapor line.

In the embodiment according to FIGS. 1 and 2, around a hollow-cylindrical part of the wall 41 of the rotating flask 4, there is provided a likewise hollow-cylindrical sleeve part 12 of a first sealing body (sliding ring) 2 that also moves around the rotational axis A when the rotating flask 4 rotates. On its front flange-shaped, widened front end, the sealing body 2 has an essentially annular front surface 20 that extends around the rotational axis A. This front surface 20 of the sealing body 2 is located immediately opposite from a corresponding surface 30 of a flange-like shaped part on the front end (stationary flat-flange) of the tubular line 5 as a counter surface. This flange-like part of the line 5 forms a second sealing body 3.

The front surface 30 of the second sealing body 3 is divided by two intermediate zones Z1 and Z2, which extend annularly around the rotational axis A and concentrically to the rotational axis, into three ring-segment, concentric and even (flat, plane) sealing faces 31, 32 and 33 (numbered in the sequence from the inside out). The intermediate zones Z1 and Z2 are formed according to FIGS. 1 and 2 as grooves in the flange-like sealing body 3, and the areas between them are configured with the sealing faces 31 to 33 practically as hollow shafts. The surface 20 of the first sealing body 2 can likewise be divided, as shown, by ring-shaped grooves into three even sealing faces with the same radii as the sealing faces 31 to 33 or else they can be continuously plane (even). In both cases, the sealing bodies 2 and 3 are only in contact with the sealing faces 31 to 33 of the second sealing body 3 and with the corresponding counter surfaces on the first sealing body 2, thus forming three sealing areas that are separate from each other and radially staggered with respect to each other. Now an adjusting means 6 situated on the front end of the sealing body 2 and facing away from the front surface 20 can be used to push or press the corresponding sealing faces on the surface 20 of the sealing body 2 against the corresponding sealing faces 31 to 33 of the second sealing body 3.

It is also conceivable for the grooves to only be present in the sealing body 2.

When the rotating flask 4 is rotated around the rotational axis A, the first sealing body (sliding ring) 2 is also rotated and, in the three sealing areas, the sliding sealing faces of the first sealing body 2 and 31 to 33 of the second sealing body 3, which turn relative to each other, seal the inner chamber 40 of the rotating flask 4 and the inner chamber 50 of the line 5 that is immediately adjacent in the direction of the rotational axis A with respect to the outer chamber. The two sealing bodies 2 and 3 thus form an axial rotary sealing device for the rotating flask 4 and the line 5 at their connection site.

Especially when a relatively large pressure differential prevails between the pressure (external or ambient pressure) designated as p5 in the outer area and the pressure (internal pressure) designated as p1 in the inner chamber 40 and 50 of the rotating flask 4 and of the line 5, high demands are made to the leak-tightness of the three concentric sealing areas with the sealing faces 31 to 33. Thus, for example, when the rotating flask 4 is evacuated by a vacuum pump via the line 5, the pressure differentials between the internal pressure p1 in the rotating flask 4 of the rotary film evaporator and the atmospheric pressure as the external pressure (ambient pressure) p5 amount to about 1,000 mbar.

However, even if a leak occurs in the sealing areas, the negative effects of a leak can be avoided or at least ameliorated by controlling the pressure or the gas atmosphere in the intermediate zones Z1 and Z2 according to the invention. For this purpose, on the side of the sealing body 3 facing away from the surface 30, the intermediate zones Z1 and Z2 each have two, preferably diametrically opposed, connections A1 and B1 or A2 and B2, respectively. Of these connections A1, A2, B1 and B2, only one or both are used for various functions and application cases, which is why the connections A1, A2, B1 and/or B2 can at least partially be closed manually or automatically. For this purpose, closing means (not shown here) are provided such as, for example, magnetically or electromagnetically controllable valves.

If, in a first mode of operation, the connection B1 is closed and the intermediate zone Z1 is evacuated by means of a vacuum pump attached to the connection Al, then a pressure p2 can be established in the intermediate zone Z1 which is much closer to the internal pressure p5 in the rotating flask 4 than to the external pressure (atmospheric pressure) p5. As a result, the vacuum deterioration in the evacuated inner chamber 40 of the rotating flask 4 can be reduced in case of leakage in the sealing system. For example, the internal pressure p1 in the rotating flask 4 can be set to 20 mbar and the pressure p2 in the intermediate zone Z1 can be set to 25 mbar. The pressure differential between the internal pressure p1 of the rotating flask 4 and the zone pressure p2 in the intermediate zone Z1 then amounts to only 5 mbar in comparison to a pressure differential of, for example, 975 mbar between the pressure p2 in the zone Z1 and the atmospheric pressure p5 in the outer area. Now, as an additional pressure stage, the second intermediate zone Z2 can be used and likewise evacuated, whereby the pressure p3 is preferably set between the external pressure p5 and the pressure p2 in the inner intermediate zone Z1. The outer intermediate zone Z2, however, is not absolutely necessary in this mode of operation and can be dispensed with.

In another mode of operation, in which solvents are evaporated in the rotary film evaporator and a substance dissolved therein is correspondingly concentrated, the connections B1 of the intermediate zone Z1 and the connections B2 of the intermediate zone Z2 are closed. Via the connection A1, using a suitable device, solvent vapor is fed into the inner intermediate zone Z1, whereby the solvent from which the solvent vapor is generated usually corresponds to the solvent in the rotating flask 4, but also can be another solvent that does not interfere with the process. In contrast, the outer intermediate zone Z2 is evacuated via the connection A2 in such a way that the pressure p3 in the outer intermediate zone Z2 is equal to the pressure p2 in the inner intermediate zone Z1.

The result of these measures is that, in case of a leak in the sealing faces 31, 32 and 33, first of all, solvent vapor moves from the intermediate zone Z1 via the leak into the evacuated inner chamber 40 of the rotating flask 4 and into the inner chamber 50 of the line 5, and is condensed out by the condenser of the rotary film evaporator and secondly, due to the fact that the zone pressures p2 and p3 are equal, practically no gas (air or vapor) moves from the outer intermediate zone Z2 into the inner intermediate zone Z1, but rather, it is already captured by the outer intermediate zone Z2. Therefore, a leak in the sealing device has no relevant influence on the vacuum or on the mode of operation of the rotary film evaporator.

In another mode of operation of the sealing device according to FIGS. 1 and 2, at the two connections A1 and B1 as well as A2 and B2 of each of the intermediate zones Z1 and Z2, different pressures p2 and p2' or p3 and p3', respectively, are generated and a gaseous, vapor or liquid coolant (cooling agent, solvent) is fed through or into the intermediate zones Z1 and Z2 in order to cool (to dissipate heat) the sealing areas (31 to 33). Here, the coolant is fed in a coolant circulation system with a cooling device or a heat exchanger.

Conversely, in another mode of operation, the sealing device can also be heated in a simialar manner, for example, to clean the sealing faces or to utilize thermal expansions, in that a gaseous, vapor or liquid heating medium is fed through or into the intermediate zones Z1 and Z2 via their connections A1 and B1 or A2 and B2, with the heating medium being conveyed in a thermal circulation system with a heat exchanger or a heating device.

In an especially advantageous mode of operation, using one or both of the intermediate zones Z1 and/or Z2, a leak in the sealing device is detected and the degree or extent of the leak is determined. For this purpose, for example, the inner intermediate zone Z1 is evacuated via the connection A1 by a vacuum pump down to a certain pressure p2 and the connection A2 is then closed. A measuring means connected to the second connection B1 or to the intermediate zone Z1 now continuously measures the pressure p2' in the intermediate zone Z1. If a leak is present, the pressure p2' in the intermediate zone Z1 rises again. The faster the pressure p2' in the intermediate zone Z1 changes, the leakier the sealing system is. By evaluating the pressure change over time on the basis of the measured pressure values and their variations over time, conclusions can be drawn about the extent of the leakiness. Moreover, changes over time of the pressure p2' and/or pressure differentials of the pressures p2' and p3' of the zones Z1 and Z2 and of the pressure p1 of the evacuated inner chamber 40 and 50 of the rotary film evaporator can be compared in any desired order so as to arrive at optimal conclusions and strategies or to derive prognoses on the remaining service life of the sealing system of the rotary film evaporator.

The sealing device according to FIGS. 1 and 2 can be modified in many ways.

Thus, for instance, the form of the intermediate zones Z1 and Z2 can also diverge from the annular shape and, for example, can also be eccentric and/or elliptical. In general, the intermediate zones Z1 and Z2 each surround the rotational axis A.

Furthermore, the number n of the intermediate zones and correspondingly the number n+1 of the sealing areas can be any desired natural number, starting with 1.

Figure 3:
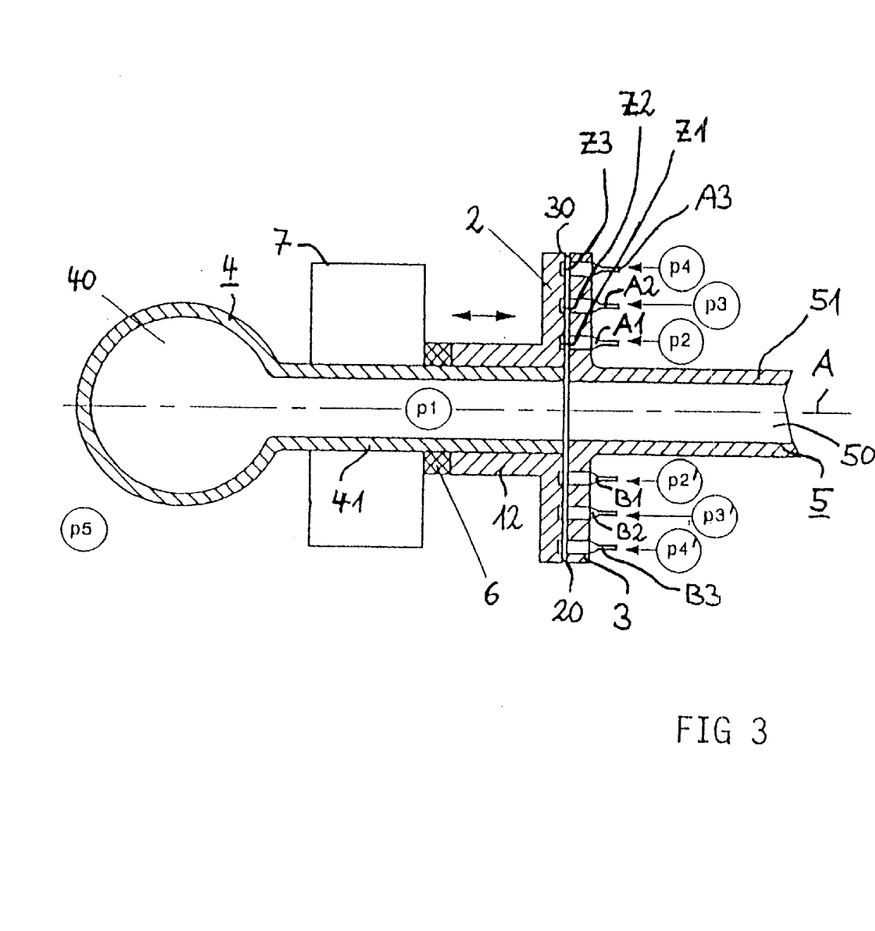
FIG. 3—shows a longitudinal cross-sectional view of a rotary film evaporator with a sealing device to seal the rotating flask and the vapor line with three concentric intermediate zones.
Figure 4:
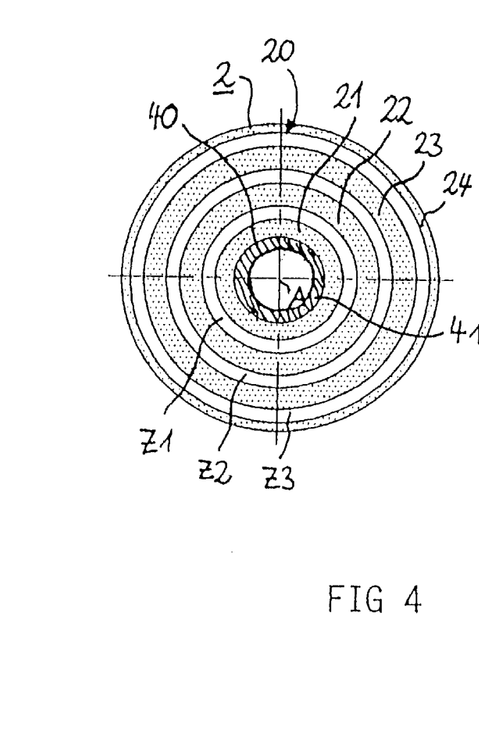
FIG. 4—shows a transverse cross-sectional view of the sealing device according to FIG. 3 on the rotating flask.

FIGS. 3 and 4 show a modified embodiment of the sealing device for a rotary film evaporator according to FIGS. 1 and 2 in which a third intermediate zone Z3 is structured with two connections A3 and B3 outside of the intermediate zone Z2 and concentrically to it. The corresponding four sealing faces on the first sealing body 2, which are separated by the intermediate zones Z1 to Z3, are designated with the numerals 21 to 24. The additional intermediate zone Z3 can contain, for example, nitrogen ($N_2$), a noble gas and/or solvent vapor or liquid solvent or else can be evacuated, whereby the pressure p4 in this intermediate zone Z3 depends on the application purpose.

Process-neutral or process-inherent fluids can also be fed into other intermediate zones and in other embodiments.

Figure 5:
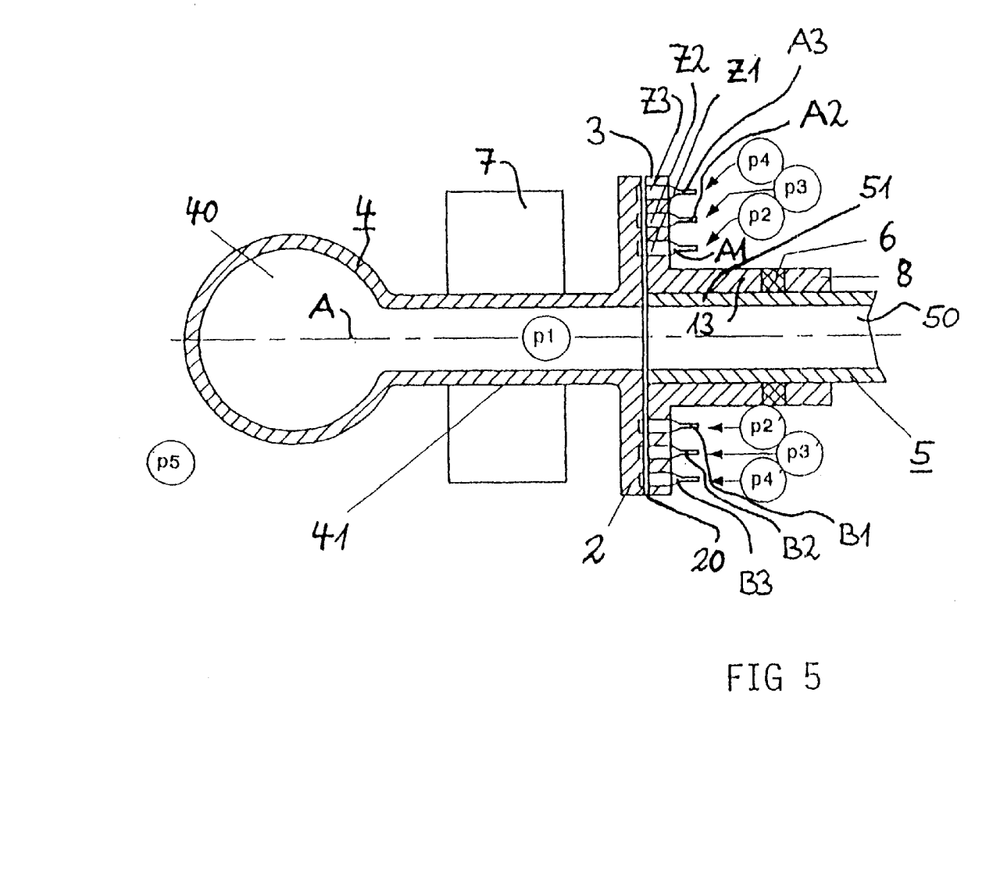
FIG. 5—shows a longitudinal cross-sectional view of another embodiment of a rotary film evaporator with a sealing device to seal the rotating flask and the vapor line with three concentric intermediate zones.
Figure 6:
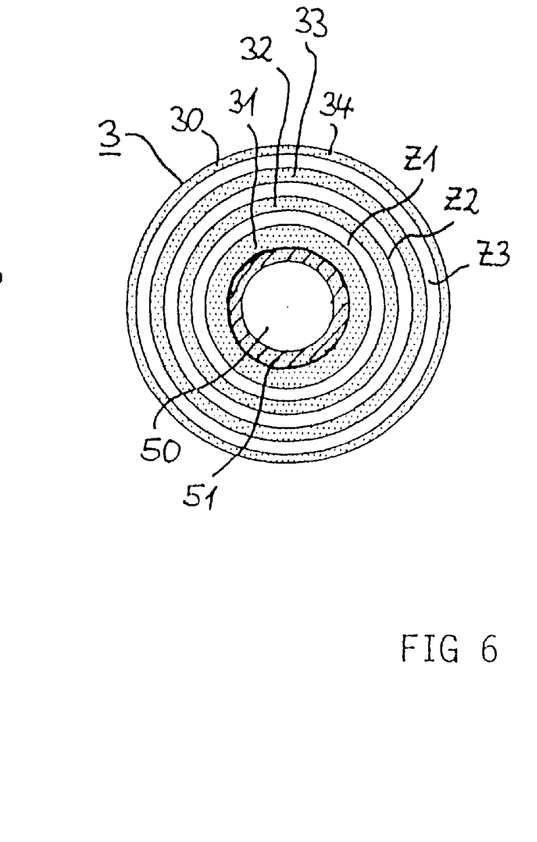
FIG. 6—shows a transverse cross-sectional view of the sealing device according to FIG. 5 on the vapor line.

The sealing device according to FIGS. 5 and 6 also has three concentric intermediate zones Z1 to Z3, which form four sealing areas of which the four sealing faces 31 to 34 are shown on the second sealing body 3. In contrast to FIGS. 1 to 4, the first sealing body 2, which can be rotated with the rotating flask 4 in this embodiment, is formed with a flange adjoining the front end of the rotating flask 4, and the stationary second sealing body 3 is arranged with a hollow-cylindrical part 13 like a sliding ring on the outside of the wall 51 of the line 5. The sealing body 3 can be pressed by an adjusting means 6, which is affixed by a fixation means, with its flange-like, front end part against the first sealing body 2.

Figure 7:
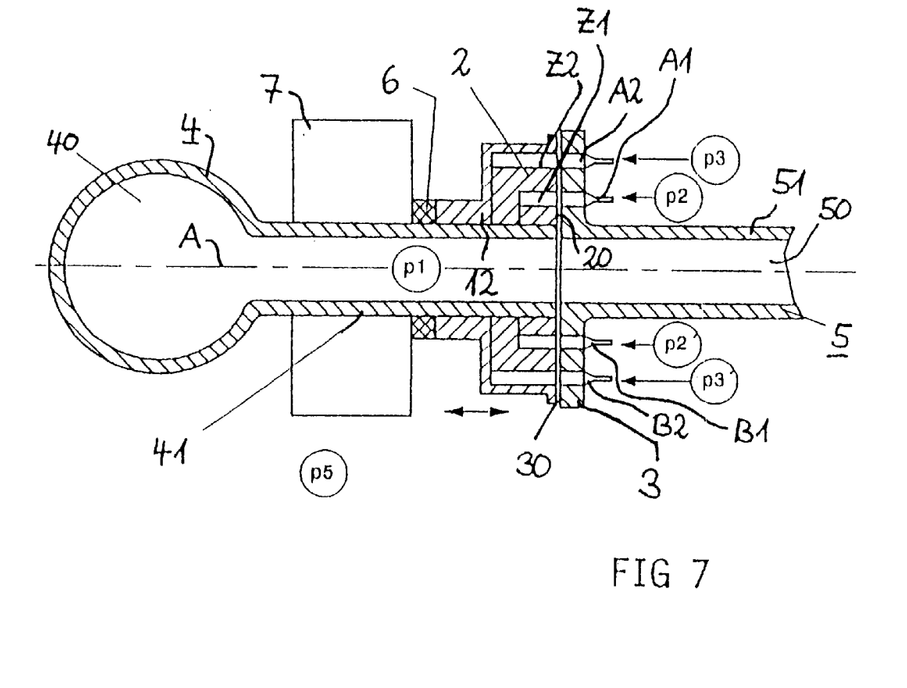
FIG. 7—shows a longitudinal cross-sectional view of another embodiment of a rotary film evaporator with a sealing device for sealing the rotating flask and the vapor line with two concentric intermediate zones.
Figure 8:
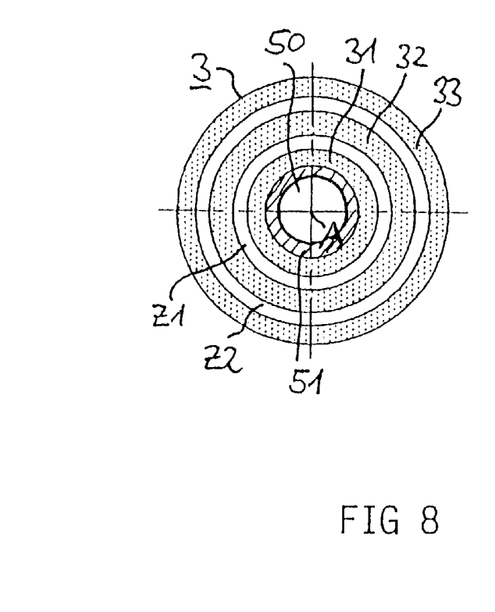
FIG. 8—shows a transverse cross-sectional view of the sealing device according to FIG. 7 on the rotating flask.

In the embodiment of the sealing device according to FIGS. 7 and 8, each of the two intermediate zones Z1 and Z2 consists of a circumferential groove in the second sealing body 3, on which the connections A1 and B1 or A2 and B2 are also provided, on one hand, and of an intermediate gap between two individual partial bodies of the sealing body 2 (sliding rings, hollow shafts), on the other hand. This translates into much deeper grooves in the first sealing body (sealing body assembly) 2 in comparison to FIGS. 1 and 2, which results in enlarged volumes of the intermediate zones Z1 and Z2. The gap between the partial bodies of the first sealing body 2 for the inner intermediate zone Z1 is selected to be smaller than that for the outer intermediate zone Z2, so that different volumes are achieved for different intermediate zones Z1 and Z2. The sealing body 3 can also be configured without grooves.

Finally, FIGS. 9 and 10 show another embodiment of an axial sealing device. The first sealing body 2 is formed by a flange-shaped end of the wall 41 of the rotating flask 4 and, as a rule, has a continuous, flat surface 20 without grooves or dents. On this surface 20 of the first sealing body 2, when it turns, three concentric sealing faces 31, 32 and 33 slide at the front end of a second sealing body 3 that is divided into several partial bodies. The sealing faces 31 to 33 are, in turn, separated from each other by the intermediate zones Z1 and Z2 which, in this embodiment, are only formed by recesses in the second sealing body 3 or interspaces between their partial bodies, and they have no continuations in the first sealing body 2. The sealing faces 31 to 33 can once again be pressed with an adjustment means 6 on the second sealing body 3 and with a fixation means 8 against the counter surface 20 on the first sealing body 2 for purposes of sealing. The lines, however, can also run directly through the sealing body 3.

In contrast to the embodiments described so far, in the embodiment according to FIGS. 9 and 10, the connections A1 and B1 of the inner intermediate zone Z1 and the connections A2 and B2 of the outer intermediate zone Z2 are each connected—via corresponding lines L1 and M1 or L2 and M2, respectively—to the corresponding intermediate zones Z1 and Z2. The lines L1, L2, M1 and M2 run from the intermediate zones Z1 and Z2 to the inside through a passage in the wall 51 of the line 5, and they extend axially over a certain length through the inner chamber 50 of the line 5, then once again opening at an axially offset location through the wall 51 into the corresponding connection A1 or A2 and B1 or B2, respectively. The connections A1, A2, B1 and B2 can be offset spatially in any desired manner with respect to the sealing faces 31 to 33. However, the lines can also run directly through the sealing body 3.

The intermediate zones according to the invention, in addition to the above-described axial sealing devices for the rotating flask 4, can also advantageously be used for radial sealing devices. Such radial seals are shown in FIGS. 11, 12 and 13. FIGS. 11 through 13 each illustrates a rotational connection site of a rotary film evaporator that connects a rotating flask 4 with a line 9. A wall of the line 9 is designated with the numeral 91 and an inner chamber surrounded by the wall 91 is designated with the numeral 90.

In FIG. 11, the wall 41 of the rotating flask 4 and the wall 91 of the line 9 are each configured so as to be hollow-cylindrical and coaxial relative to the rotational axis A. The wall 91 of the line 9 has the larger diameter and is held at a distance from the inner wall 41 of the rotating flask 4 by three sealing bodies R1, R2 and R3 which are formed as sliding rings or radial shaft sealing rings. The sealing bodies R1 to R3 are each attached to the inside of the wall 91 of the line 9 and each slides with a circumferential sealing face 71 or 72 or 73, on the outer surface 42 of the wall 41 of the rotating flask 4 when the latter rotates. Together with the outer surface 42 of the wall 41, the sealing faces 71 to 73 form each a sealing area, that is to say, the wall 41 serves as a sealing body. Preferably, the sealing bodies R1 to R3 are tapered inwards towards the sealing faces 71 to 73. The sealing bodies R1 to R3 are axially spaced from each other in the direction of the rotational axis A, thus forming intermediate zones Z1 between the sealing bodies R1 and R2, and Z2 between the sealing bodies R2 and R3. In turn, two diametrically opposed connections A1 and B1 as well as A2 and B2 open up into these intermediate zones Z1 and Z2 through the wall 91 of the line 9. The functions and modes of operation of the intermediate zones Z1 and Z2 are completely analogous to the already described axial seals so that, for the sake of avoiding repetitions, this no longer needs to be discussed.

FIG. 12 shows a radial sealing device with four axially spaced sealing bodies R1 to R4 and three intermediate zones Z1 to Z3, which are each associated with two connections A1 and B1 or A2 and B2 or A3 and B3, respectively. The use of the intermediate zones Z1 to Z3 is analogous to the axial seal with three intermediate zones according to FIGS. 3 and 4.

The sealing device according to FIG. 13 also has three intermediate zones Z1 to Z3 and four sealing bodies R1 to R4 that have sealing faces 71 to 74 and that are separated from each other by these intermediate zones Z1 to Z3. In contrast to FIG. 12, however, the sealing bodies R1 to R4 are attached to a rotating part, that is to say, to the rotating flask 4, so that they turn when the latter rotates. In this process, the sealing faces 71 to 74 slide on the outer surface 92 of the wall 91 of the line 9 which, in this embodiment, has a smaller diameter than the wall 41 of the rotating flask 4. Another difference from FIG. 12 is that the intermediate zones Z1 to Z3 (similar to FIG. 9) are connected via lines L1 to L3 or M1 to M3, respectively, with the associated, axially spaced connections A1 to A3 or B1 to B3, respectively. The lines L1 to L3 and M1 to M3 are laid through the wall 91 and, in-between, axially through the inner chamber 90 of the line 9.

The sealing faces 71 to 74 according to FIGS. 11 to 13 can also face outwards in a further embodiment (not shown here).

Moreover, the even or cylindrical sealing faces in the embodiments described so far can also, in principle, be configured so as to be curved in any desired way, whereby convex areas of one of the sealing faces lie opposite correspondingly complementarily shaped concave areas of the associated sealing face. For example, spherical (ball-shaped) sealing faces can be provided.

The number of connections for the intermediate zones is not limited to two or to any number in any of the embodiments described. Moreover, the arrangement of the connections can be varied over a wide range.

Furthermore, in another embodiment (not shown here), the axial sealing systems and the radial sealing systems according to the invention can also be combined with each other and a corresponding number of intermediate zones can be built up. As a result, the leak-tightness can be additionally improved.

The adjusting means 6, which presses the sealing faces against each other in the axial sealing devices shown in FIGS. 1 through 10, can be formed in a generally known manner with a spring that generates an unchangeable surface pressure that is only provided by the spring properties and that presses the sealing faces against each other.

The sealing effect of the sealing device, however, can be additionally improved even further if the surface pressure is controllable, that is to say, if it can be freely adjusted between various prescribed values and can be automatically changed at any point in time.

Figure 14:
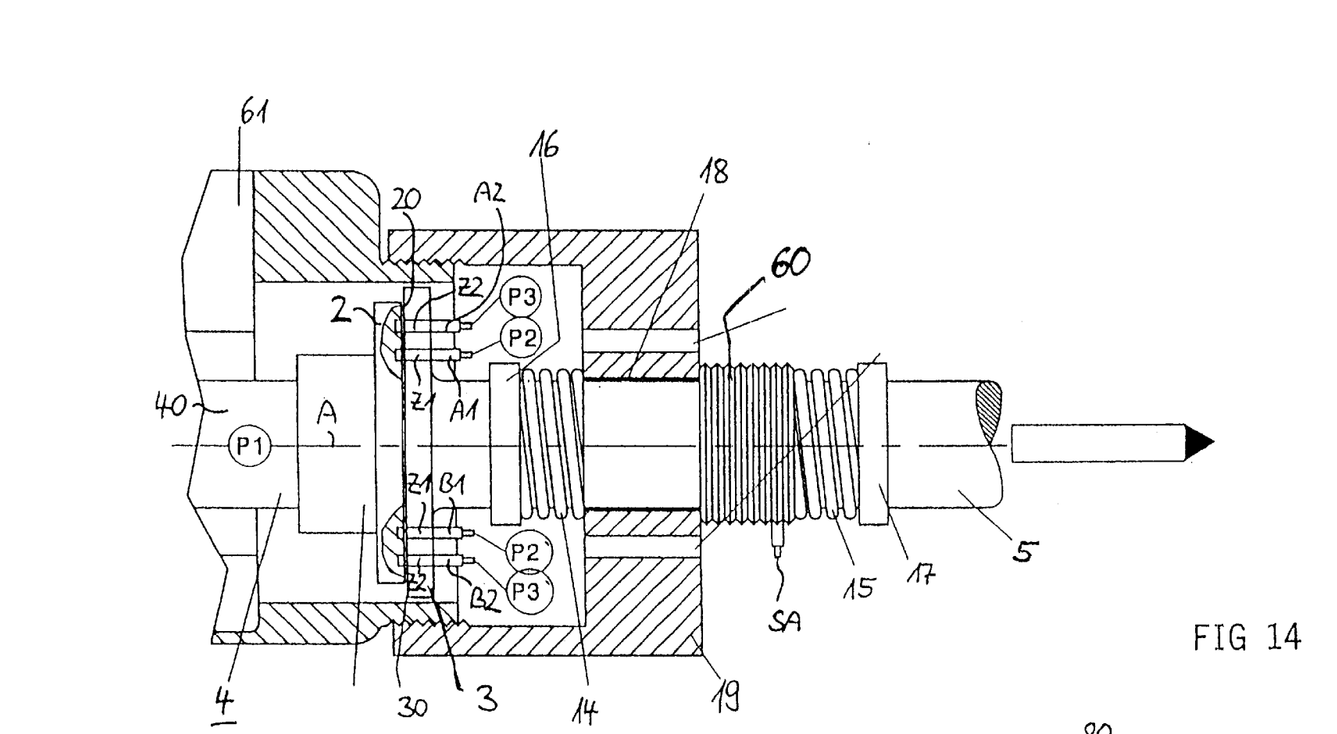
FIG. 14—a sealing device of a rotary film evaporator with a surface-pressure control device.

FIG. 14 shows such a sealing device with controllable surface pressure between the sealing faces of the two sealing bodies 2 and 3 that lie opposite from each other on the surfaces 20 and 30. The first sealing body 2 is affixed to the rotating flask 4, that is to say, it is not axially movable, and it rotates along with the rotating flask 4, while the second sealing body 3 is stationarily coupled to the line 5. Again, like in FIGS. 1 and 2, two intermediate zones Z1 and Z2 are formed, mainly in the first sealing body 2, and said intermediate zones are each provided with two connections A1 and B1 as well as A2 and B2 and they separate three pairs of sealing faces (not indicated in FIG. 14) from each other.

The line 5 (vapor tube) is mounted in a guide holder 19 so as to be axially movable via a sliding sleeve 18. The guide holder 19 can be attached on a counter body 61, especially by means of a threaded connection. The two springs 14 and 15 are prestressed on the outside of the line 5 via a fixation ring 16 and 17, respectively, as well as via the guide holder 19. Thanks to their springy-elastic restoring forces, the two springs 14 and 15 generate a certain pressing force per surface area, that is to say, a surface pressure with which the two sealing bodies 2 and 3 are pressed against each other. This basic surface pressure can be additionally varied by means of a mechanically controllable expansion element 60, which is connected in series to the springs 14 and 15, as a surface-pressure control element.

The expansion element 60 has a control connection SA and can expand axially differently, i.e. parallel to the rotational axis A, depending on a controlling quantity applied to the control connection SA. This different expansion correspondingly generates a different pressing force (surface pressure) on the sealing faces between the two sealing bodies 2 and 3.

The controllable expansion element 60 can especially be:
 a pneumatic or hydraulic element that is controlled at the control connection SA by a pressure as the controlling quantity, for example, two expansion bellows or bellows-like components that are configured inside each other, for example, coaxially, whereby a control medium is applied to the interspace of the expansion bellows,
 an element that is electrically controllable via a control current or a control voltage as the controlling quantity, for example, an electric linear motor,
 a thermal expansion body whose length depends on its temperature, whereby a thermal energy, heat amount or temperature is used as the controlling quantity at the control connection SA by means of heating and/or cooling the expansion body. The heating can especially be provided electrically by a heating element, and the cooling can especially be provided by a Peltier element, and the heating and cooling can take place by reversing the pole of a Peltier element.

The controllable expansion element 60 is preferably used for automatic compensation (equalization) of leaks that occur between the sealing faces of the sealing bodies 2 and 3. For this purpose, the leakiness in the sealing system is detected, for example, by measuring pressure differentials between two of the pressures from the group of pressures comprising the internal pressure p1 in the rotating flask 4 and the pressures p2 or p3 (or p2' and p3') in the intermediate zones Z1 and Z2 in the manner described above.

Figure 15:
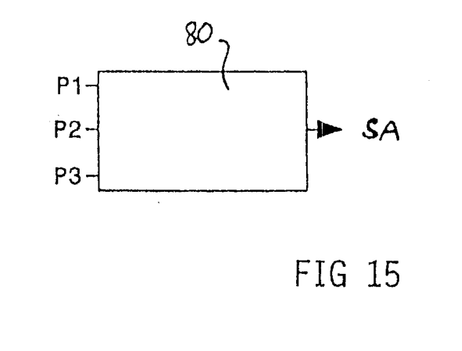
FIG. 15—a schematic view of monitoring means for a surface-pressure control device according to FIG. 14.

FIG. 15 shows a schematic diagram of a generally electronic measuring means or monitoring means 80 that, on the basis of the three pressures p1 to p3 at its inputs, generates a corresponding controlling value at its output, which is supplied to the control connection SA of the expansion element 60.

Alternatively, as a measure of the leak-tightness or leakiness of the sealing device, it is also possible to measure the vacuum pressure p1 in the rotating flask 4 or rotary film evaporator, or the vapor temperature and/or the temperature of the product in the rotating flask 4, or the heating capacity of the heating bath for the rotating flask 4 or the cooling capacity of the condenser or the vapor velocity. Then, in particular, no intermediate zones are necessary at the sealing bodies 2 and 3, which then can also have continuous sealing faces.

If the monitoring means 80 determines on the basis of the pressures p1 to p3 (or of other measuring quantities) that the leak-tightness of the sealing device has dropped beyond a tolerable extent, especially beyond a prescribed threshold value, then it regulates the expansion element 60 via the controlling value SA in such a way that the leak-tightness once again falls within a tolerance range above the threshold value.

This generally happens in that the surface pressure on the sealing faces is increased. Through the continuous monitoring of the leak-tightness via the appropriate measuring quantities such as, for example, the pressures p1 to p3, the monitoring means 80 can determine whether the increase in the pressing force on the sealing faces was successful or not. If the sealing faces are dirty, for example, a temporary reduction of the pressing force (of the surface pressure) can be advisable. The electronic monitoring means 80 is preferably set up in such a way that it checks all possibilities (increase or decrease of the pressing force at the same pressure or the same pressure differential) in order to achieve the most optimal possible result (highest possible leak-tightness).

Hence, with this embodiment, the leak-tightness of the sealing device is regulated by the expansion element 60 by controlling the surface pressure on the sealing faces and is kept within a tolerance range so that leaks can be eliminated.

In another mode of operation, the sealing faces can also be thermally disinfected or cleaned by temporarily increasing the surface pressure (pressing force) of the sealing faces and by the resultant heating up of the sealing face.

In all of the embodiments, the rotating flask 4 can also be made in two or more parts, consisting of a front part that can be taken off or replaced via a flange intermediate piece and that forms the actual process piston and of a shaft part that is usually firmly coupled to the drive means 7, said shaft part corresponding to the wall 41 of the rotating flask 4. The rotatable cavity is then the inner chamber of the hollow wall 41. To put it more precisely, the sealing device here serves to seal two hollow shafts or fluid lines that can be rotated in opposite directions.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A sealing device for sealing a cavity (40) that can be rotated around a rotational axis (A), comprising:
    at least two sealing areas arranged one after another and separated from each other by at least one intermediate zone (Z1 to Z3);
    two sealing faces (20, 21 to 24, 30, 31 to 33, 41, 71 to 74) within each of the at least two sealing areas, continuously extending around the rotational axis and slidingly movable over each other upon rotation of the cavity (40), and
    at least one connection (B1 to B3) for discharging, fluids out of the at least one intermediate zone for creating a negative pressure therein for reducing leakage from the cavity.

2. The sealing device according to claim 1, wherein the at least two sealing areas are offset radially relative to each other with respect to the rotational axis.

3. The sealing device according to claim 2, wherein the at least one intermediate zone and the at least two sealing areas are arranged essentially concentrically around the rotational axis.

4. The sealing device according to claim 1, wherein the at least two sealing areas are aligned essentially perpendicularly to the rotational axis.

5. The sealing device according to claim 1, wherein the at least two sealing areas are offset axially relative to each other with respect to the rotational axis.

6. The sealing device according to claim 1, wherein the sealing faces are formed essentially rotation-symmetrically relative to the rotational axis.

7. The sealing device according to claim 5, wherein the sealing faces extend essentially parallel to the rotational axis.

8. The sealing device according to claim 1, comprising at least three sealing areas (21, 22) separated from each other by an intermediate zone.

9. The sealing device according to claim 1, comprising at least one first sealing body rotatable with the cavity, and at least one stationary, non-rotatable with the cavity, second sealing body, wherein the sealing faces are formed by surfaces of the facing each other, first and second bodies.

10. The sealing device according to claim 9, wherein the first sealing body is formed by a wall of the rotatable cavity or is connected to a wall of the cavity one of at an end and on outside thereof.

11. The sealing device according to claim 1, comprising means for sealing a connection area of the rotatable cavity with a stationary additional cavity provided for charging fluids into the rotatable cavity.

12. The sealing device according to claim 11, wherein the sealing device comprises at least one first sealing body rotatable with the cavity, and at least one stationary, non-rotatable with the cavity, second sealing body, wherein the sealing faces are formed by surfaces of the facing each other first and second bodies, and wherein the second sealing body is formed by a wall of the stationary additional cavity or is connected to a wall of the stationary additional cavity on one of outside and at end of the stationary additional cavity.

13. The sealing device according to claim 11, wherein respective connections and associated intermediate zones are connected to each other via one of lines extending through the rotatable cavity (40) and lines extending through the additional cavity (50).

14. The sealing device according to claim 1, comprising fluid conveying means connectable to the at least one connection of the at least one intermediate zone in order to convey fluids into the intermediate zone.

15. The sealing device according to claim 14, comprising means for regulating the fluid conveying means and connections for establishing the negative pressure in the at least one intermediate zone.

16. The sealing device according to claim 15, wherein a predetermined pressure differential between the pressure in the at least one intermediate zone and pressure in one of the rotatable cavity and a process chamber connected to the rotatable cavity is controlled by controlling the fluid conveying means.

17. The sealing device according to claim 16, comprising a collecting means connectable to at least one connection piece for the at least one intermediate zone.

18. The sealing device according to claim 17, wherein the collecting means includes one of a condensation device and an absorption device for collecting gaseous substances which entered the at least one intermediate zone.

19. The sealing device according to claim 14, wherein the fluid conveying means is regulated for cooling or heating the sealing areas.

20. The sealing device according to claim 14, wherein operation of the fluid conveying means is regulated.

21. The sealing device according to one of claim 14, comprising connections for one of feeding and passing one of a sliding agent and lubricant provided for the sealing faces into the at least one intermediate zone, and wherein the fluid conveying means and the connections are regulated.

22. The sealing device according to claim 14, comprising connections for one of feeding and passing a cleaning agent provided for the sealing faces into the at least one intermediate zone, and wherein the fluid conveying means and the connections are regulated.

23. The sealing device according to claim 1, comprising a means connectable with the at least one connection for measuring pressure in the at least one intermediate zone.

24. The sealing device according to claim 23, further comprising an evaluation means for evaluating measured pressure values, and connectable to the measuring means.

25. The sealing device according to claim 1, wherein a predetermined pressure differential between at least two intermediate zones is detected in order to draw a conclusion about the leak-tightness.

26. A sealing device according to claim 1, further comprising at least one surface-pressure control element (60) for controlling surface pressure with which the sealing faces, which slide over each other, are pressed against each other, wherein the surface-pressure control element has a control connection (SA) to apply a controlling value.

27. The sealing device according to claim 26, wherein the surface-pressure control element is an expansion element that can be differently expanded in a direction perpendicular to the sealing faces as a function of the controlling value.

28. The sealing device according to claim 26, wherein the surface-pressure control element is one of a pneumatic element and a hydraulic element that is controlled via a pressure used as the controlling value at the control connection (SA).

29. The sealing device according to claim 26, wherein the surface-pressure control element is an element that can be electrically controlled via one of a control current and a control voltage as the controlling value.

30. The sealing device according to claim 26, wherein the surface-pressure control element is a thermal expansion element whose length depends on its temperature, whereby a thermal value is used as the controlling value at the control connection (SA).

31. The sealing device according to claim 26, comprising means for monitoring the leak-tightness at the sealing faces and for maintaining the leak-tightness within a predetermined tolerance range by controlling the surface-pressure control element.

32. The sealing device according to claim 31, wherein the monitoring means comprises means for measuring pressure in the at least one intermediate zone and means for evaluating measured pressure values.

33. The sealing device according to claim 32, wherein in a cleaning or disinfecting mode, the surface pressure of the sealing faces is increased by the surface-pressure control element.

34. A rotary film evaporator, comprising a rotating flank (4) that has a rotatable cavity (40) to hold substances to be evaporated; and a sealing device for sealing the cavity (40) that can be rotated around a rotational axis (A) and which comprises:

at least two sealing areas arranged one after another and separated from each other by at least one intermediate zone (Z1 to Z3);

two sealing faces (20, 21 to 24, 30, 31 to 33, 41, 71 to 74) within each of the at least two sealing areas continuously running around the rotational axis and slidingly movable over each other upon rotation of the cavity (40), and at least one connection (A1 to A3, B1 to B3) for at least one of charging, discharging, and passing fluids into, out of, and through the at least one intermediate zone, respectively.

35. The rotary film evaporator according to claim 34, comprising at least two sealing devices.

* * * * *